INVENTORS
Roger Kinnicutt Jr.
BY Donald Sieurin
Russell, Chittick & Pfund
Attorneys July 5, 1966 R. KINNICUTT, JR., ET AL 3,258,951
ROD SWITCHING APPARATUS
Filed Aug. 22, 1963 7 Sheets-Sheet 6

INVENTORS
Roger Kinnicutt Jr.
BY Donald Sieurin
Russell, Chittick & Pfund
Attorneys July 5, 1966 R. KINNICUTT, JR., ET AL 3,258,951
ROD SWITCHING APPARATUS
Filed Aug. 22, 1963 7 Sheets-Sheet 7

INVENTORS
Roger Kinnicutt Jr.
BY Donald Sieurin
Russell, Chittick & Pfund
Attorneys

United States Patent Office 3,258,951
Patented July 5, 1966

3,258,951
ROD SWITCHING APPARATUS
Roger Kinnicutt, Jr., Worcester, and Donald Sieurin, Northboro, Mass., assignors to Morgan Construction Company, Worcester, Mass., a corporation of Massachusetts
Filed Aug. 22, 1963, Ser. No. 303,841
7 Claims. (Cl. 72—203)

This is a continuation-in-part of our copending patent application, Serial No. 86,387, filed on February 1, 1961, now Pat. No. 3,109,340.

This invention relates to rod switches and more particularly to a rod switching apparatus positioned downstream from a dividing shear in a rolling mill in order to dispose of cropped ends and to direct acceptable rod portions to selected pouring reels.

In a rolling mill, the cross-sectional dimensions of an entering billet are continuously reduced by successive rolling operations with the finished work product emerging from the last finishing stand in the form of a continuous undivided rod of extremely long length. Due to rolling conditions, however, the end portions of the rod are usually off-gauge and must therefore be cropped by the dividing shear and removed.

In addition, it should be noted that rod consumers usually require rod coils of a weight considerably less than the total original billet weight. Furthermore, conventional pouring and laying reels are not designed to handle the entire undivided rod length produced from a single billet. For these reasons, a continuous rod produced from a single billet is usually subdivided by the dividing shear into shorter lengths before being presented to a series of laying or pouring reels.

In the present high speed rolling mills, however, the time required to clear a single laying reel is invariably greater than the coiling time of one complete coil. Consequently, in order to insure the availability of an empty reel when required, it becomes necessary to utilize at least three laying reels for each strand. By so doing, one reel can easily be cleared within the time that it takes to fill the other two reels.

It is therefore necessary to provide a rod switching means capable of directing oncoming divided rod portions to one of at least three laying reels without impairing the continuous operation of the mill. Attempts have been made in the past to develop switching apparatus capable of directing divided lengths of rod to various reels. These attempts have involved the use of complicated designs, expensive machinery and have only been partially successful in meeting the requirements of modern high speed mills.

It is therefore an object of the present invention to provide a rod switching means capable of receiving acceptable rod portions from a dividing shear and delivering said rod portions through various paths to selected laying reels.

Another object of the present invention is to provide a switching means capable of handling both off-gauge cropped end portions and acceptable rod portions.

Another object of the present invention is to provide a switching means capable of directing off-gauge cropped ends to crop receiving apparatus while simultaneously directing acceptable rod portions to selected laying or pouring reels.

A further object of the present invention is to provide an efficient yet inexpensive means of diverting successive portions of an oncoming rod to selected disposal apparatus without impairing the continuous operation of the mill.

A still further object of the present invention is to provide an improved means of disposing of off-gauge cropped end portions.

These and other objects of the present invention will become more apparent as description proceeds with the aid of the accompanying drawings in which.

Figure 1:
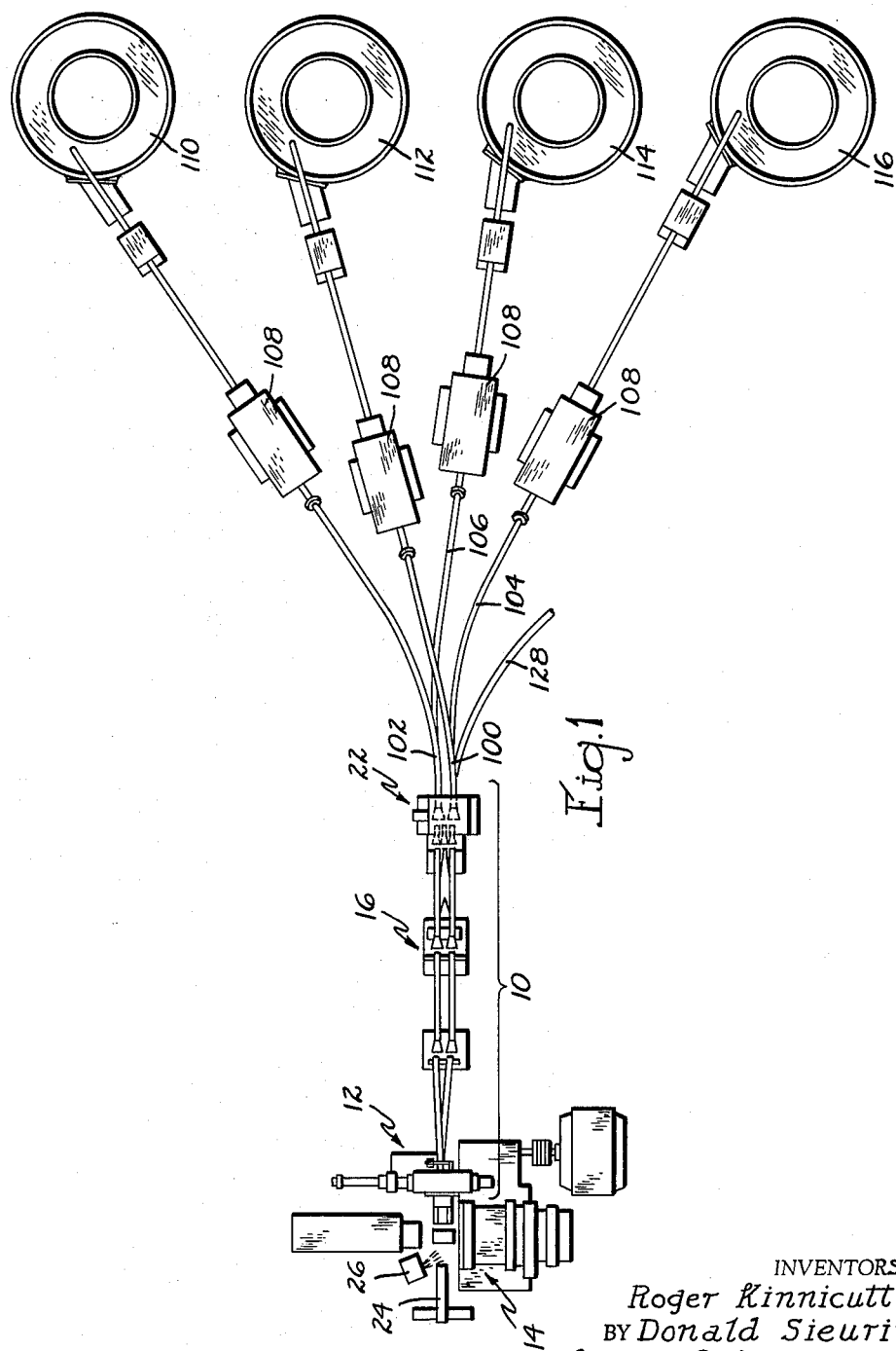
FIG. 1 is a plan view of a portion of the rolling mill extending from the dividing shear to the laying reels and incorporating the principal embodiment of the switching apparatus herein chosen for purposes of disclosure.

Referring now to the drawings, FIG. 1 is a general illustration showing the relationship of the switching apparatus generally indicated by the reference numeral 10 to other surrounding mill components. As can better be seen in FIGS. 2 and 3, the switching apparatus 10 includes the following separate switch components: a rotatable rod switch 12 positioned immediately downstream from a dividing shear generally indicated at 14; a crop switch generally indicated at 16 positioned downstream from rotatable rod switch 12 and in communication therewith through intermediate connecting pipes 18 and 20; and a reel switch positioned downstream from crop switch 16 and generally indicated at 22.

A detailed description of each switch component will now be presented in connection with the passage of rod portions therethrough. A conduit 24 leading from the final finishing stand (not shown) directs finished rod to the dividing shears 14. As previously mentioned, when emerging from the final finishing stand, the rod is in the form of a continuous length having a total weight approximately equal to the weight of the billet. At this point, the head and tail ends of the rod are usually off-gauge and consequently must be cropped and disposed of. Furthermore, as previously mentioned, the rod must be sub-divided into suitable lengths capable of being handled by conventional reeling apparatus.

Consequently, as the head end of the rod emerges from conduit 24, its presence is immediately sensed by photoelectric cell 26 which in turn emits an electrical signal used to activate an automatic system for controlling the timed sequential operation of both the shear and the switching apparatus. When desired, the switching apparatus may also be operated manually. The rod then passes through a dividing shear 14 of conventional design having upper and lower rotating shear knives 28 and 30 which cooperate in cropping and dividing the rod at selected points.

Figure 2:
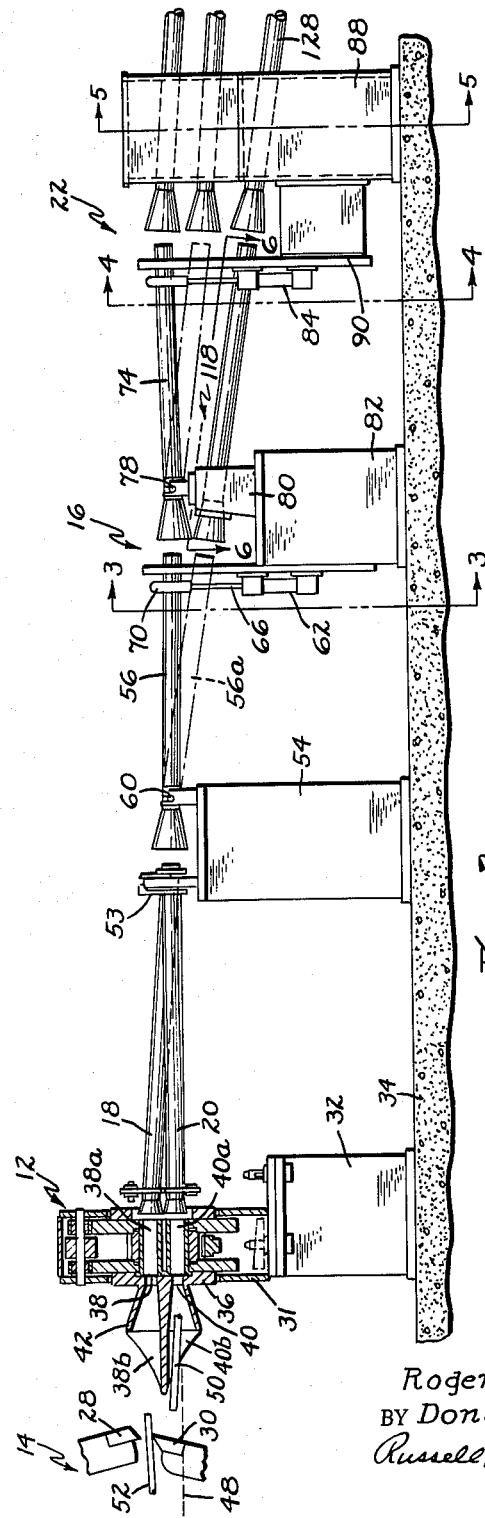
FIG. 2 is an enlarged side elevational view of the switching apparatus shown in FIG. 1.
Figure 3:
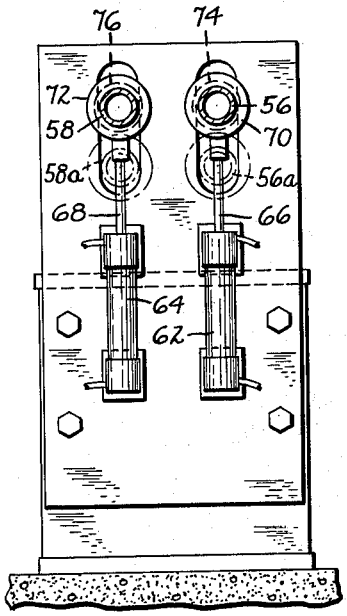
FIG. 3 is a sectional view in elevation taken along line 3—3 of FIG. 2.
Figure 4:
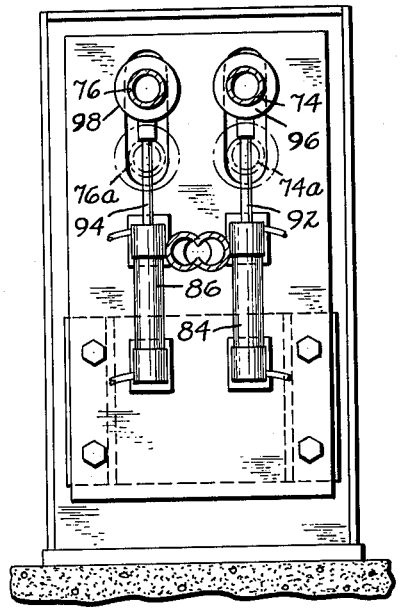
FIG. 4 is a sectional view in elevation taken along line 4—4 of FIG. 2.

The rotary rod switch 12 is shown in FIG. 2 identical to that disclosed and claimed in our co-pending application Ser. No. 86,387, and is located on the delivery side of the dividing shear 14 at a point immediately beyond the swing of shear knives 28 and 30. Rotary rod switch 12 consists essentially of a switch housing 31 fixed to a stand 32 which is in turn mounted on the mill floor 34. Switch housing 31 contains a rotatable switch body 36 having substantially parallel upper and lower passages 38a and 40a extending therethrough. A horn-shaped extension 42 internally subdivided into two entrance passages 38b and 40b is attached to the upstream side of switch body 36. As can be readily seen from the drawings, entrance passages 38b and 40b are in direct communication respectively with passages 36a and 40a and act to provide enlarged entranceways for the oncoming rod. For convenience of reference, the entrance passages 38b and 40b and passages 38a and 40a will hereinafter be referred to as rod receiving passageways 38 and 40.

By rotating switch body 36 through 180° in either a clockwise or counterclockwise direction within switch housing 31, the respective upper and lower positions of rod receiving passages 38 and 40 and entrance passages 44 and 46 can be reversed.

As can be seen in FIG. 2, rod receiving passageway 40 is a line generally with the product pass line indicated at 48. Consequently, unless shear 14 is actuated, the leading end of an oncoming rod will enter the lower passageway 40. However, when the dividing shear 14 is actuated, the rotating shear knives 28 and 30 cooperate as shown in FIG. 2 to first divide the rod and thereafter to elevate the oncoming sheared end of the next rod portion to a level corresponding to upper passageway 38.

As shown in FIG. 2, the shear 14 has just completed a cropping cycle. The cropped end 50 corresponding to an unsheared leading end has just entered passageway 40. The sheared leading end 52 of the next oncoming rod portion has been elevated to a level corresponding to that of passageway 38 by the combined action of shear knives 28 and 30. Thus it can be seen that each operation of shear 14 will result in the sheared leading end of the next oncoming rod portion being elevated to the upper passageway of rotary rod switch 12.

Intermediate pipes 18 and 20 are attached at their upstream ends to switch body 36 and are in communication with rod receiving passages 38 and 40 respectively. The downstream ends of intermediate pipes 18 and 20 are pivotly supported by bracket 53 in turn mounted on pipe stand 54. Rotation of switch body 36 will therefore result in a corresponding rotation of the upstream ends of intermediate pipes 18 and 20, their downstream ends remaining pivotally mounted within bracket 53. In this manner, once a rod portion has entered either rod receiving passageways 38 or 40 in rotary rod switch 12, its downstream travel will be continued through either intermediate pipe 18 or 20.

Upon arriving at the downstream end of either intermediate pipe 18 or 20, a rod portion will then be presented to crop switch 16 which is comprised in part of two longitudinal crop switching pipes 56 and 58. The downstream ends of both crop switching pipes 56 and 58 are vertically adjustable about pivotal supports 60 at their upstream ends from a raised position to a lowered position indicated at 56a and 58a. As can be better seen in FIG. 3 vertical adjustment of the downstream ends of crop switching pipes 56 and 58 is accomplished through the operation of vertically disposed hydraulic cylinders 62 and 64. These cylinders are each provided with extensible piston arms 66 and 68 terminating at their upper extremities in annular brackets 70 and 72 surrounding the downstream ends of pipes 56 and 58. With each cylinder 62 and 64 capable of being independently operated either automatically or manually, it can readily be seen that the downstream end of either crop switching pipe 56 or 58 can be independently adjusted.

As can be seen in FIGS. 1 and 2, a reel switch 22 is positioned downstream from crop switch 16. Reel switch 22 is comprised in part of two reel switching pipes 74 and 76 having their upstream ends pivotally mounted as at 78 by means of pivot pins extending horizontally therefrom through the upper portion of mounting bracket 80. Bracket 80 is in turn supported by pipe stand 82 of crop switch 16. The downstream ends of reel switching pipes 74 and 76 are vertically adjustable about upstream pivot point 78 from a raised position to a lowered position indicated at 74a and 76a. This vertical pivotal displacement is again accomplished through the independent operation of vertically disposed hydraulic cylinders 84 and 86 mounted on pipe stand 88 by means of an outwardly disposed support bracket 90. Cylinders 84 and 86 are again provided with extensible piston arms 92 and 94 which terminate at their upper extremities in annular brackets 96 and 98 surrounding the downstream ends of reel switch pipes 74 and 76. Thus it can be seen that by independently extending or retracting piston arms 92 and 94, the downstream ends of reel switch pipes 74 and 76 can be vertically displaced between raised and lowered positions while constantly maintaining their upstream ends in constant communication with crop switching pipes 56 and 58.

Figure 5:
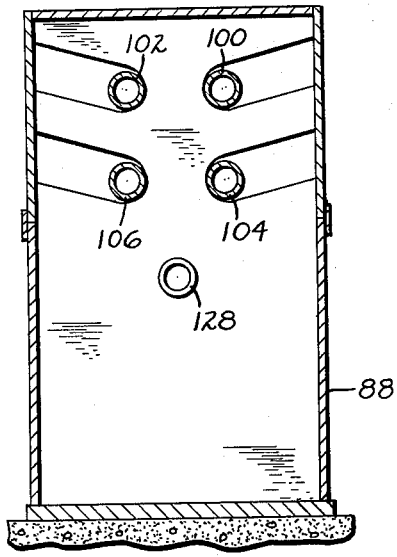
FIG. 5 is a sectional view in elevation taken along line 5—5 of FIG. 2.

Pipe stand 88 further contains the upstream ends of reel pipes 100, 102, 104 and 106 divided into upper and lower pairs as shown in FIG. 5. Reel pipes 100 and 102 extend from pipe stand 88 through cooling apparatus indicated at 108 to laying reels 110 and 112. In the same manner, reel pipes 104 and 106 extend through similar cooling apparatus to laying reels 114 and 116.

It can therefore be seen that by actuating cylinder 84 and vertically displacing the downstream end of reel switch pipe 74, either laying reel 112 or 116 can be selected to receive an oncoming acceptable rod portion. In the same manner, by vertically displacing the downstream end of reel switching pipe 76, either laying reel 110 or 114 can be selected.

Figure 6:
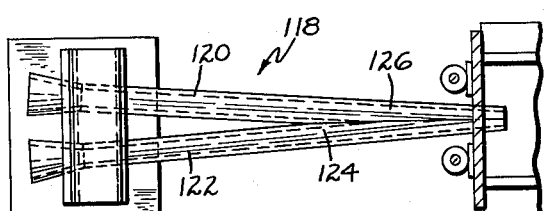
FIG. 6 is a sectional view taken along line 6—6 of FIG. 2.
Figure 7:
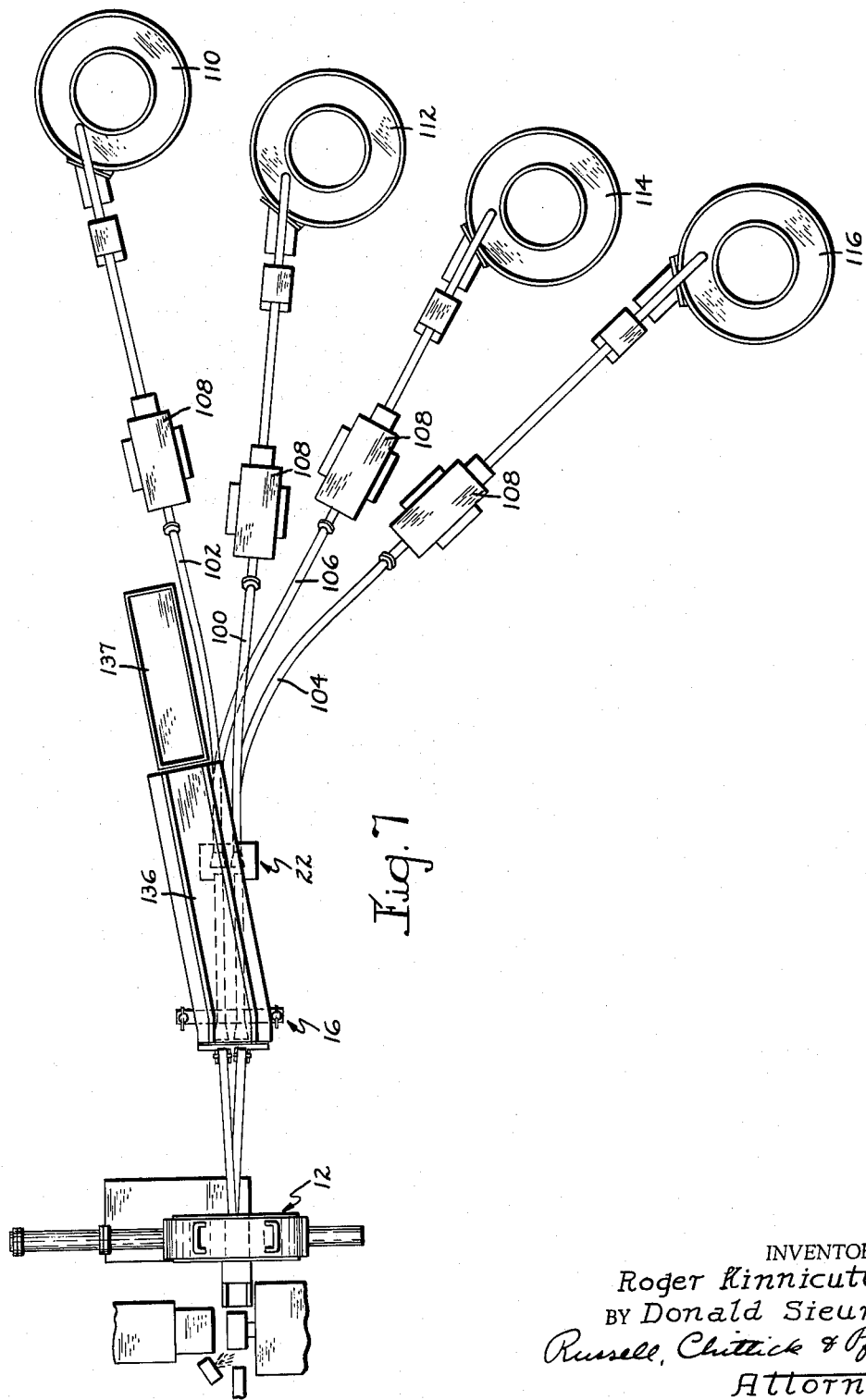
FIG. 7 is a plan view similar to FIG. 1 illustrating an alternate embodiment of the invention.

It should also be noted that mounting bracket 80 and support bracket 90 provide a means of supporting a downwardly sloping V-shaped crop receiving pipe indicated typically at 118. As can be better seen in FIG. 6, crop receiving pipe 118 is comprised of two upstream extensions 120 and 122 which gradually converge as at 124 into a single tubular downstream portion 126. A downstream continuation 128 of crop receiving pipe 118 is supported within pipe stand 88 and leads to a remotely positioned crop bin (not shown). With this construction, it can readily be seen that when the downstream ends of crop switching pipes 56 and 58 are in a raised position, a rod portion passing therethrough will continue into reel switching pipes 74 or 76. However, when either of the crop switching pipes 56 or 58 are depressed to a lowered position as at 56a or 58a, the rod portion passing therethrough will be directed to one of the upstream extensions of V-shaped crop receiving pipe 118, thereafter to be deposited through the downstream crop pipe continuation 128 to a crop bin.

Having thus described the apparatus comprising the principal embodiment of the invention, its operation will now be reviewed. However, it should again be noted at the outset of this discussion that the above-described switching apparatus can be operated either manually or automatically in timed sequence with other automated mill operations. For purposes of this discussion, it will be assumed that a continuous length of rod is to be cropped at both ends and divided into two portions.

As shown in FIG. 2, the leading end of an oncoming rod has just been cropped by dividing shear 14, producing a cropped end 50. The crop leading end 52 of the next oncoming portion has been raised by the combined action of shear knives 28 and 30. The arrangement of the switching apparatus necessary to accommodate this shear operation will now be described. The rotary switch 12 will remain in its indicated position until the leading end 52 of the next oncoming rod portion is well within intermediate connecting pipe 18 and the cropped end 50 has entered passageway 40, at which time the rotary switch is then rotated 180° to reverse the respective positions of rod receiving passages 38 and 40. Leading end 52 representing an oncoming acceptable rod portion will continue through connecting pipe 18 and thereafter enter crop switching pipe 58. In a similar manner, the cropped end 50 will continue through rod receiving passage 40 and intermediate connecting pipe 20 and thereafter enter crop switching pipe 56. Prior to this time, hydraulic cylinder 62 will have been actuated to depress the downstream end of crop switching pipe 56 to its lowered position 56a in communication with the upstream extension 122 of crop receiving pipe 118. In this manner, the cropped end 50 will proceed through the downstream continuation 128 of crop receiving pipe 118 to be ultimately deposited in a crop bin. During this period, the upstream end of crop switching pipe 58 will remain in a raised position in order to direct the leading end 52 of the oncoming acceptable rod portion to reel switching pipe 76. The downstream end of reel switching pipe 76 being in either a raised or lowered position will direct the acceptable rod portion through pipes 102 or 106 to either reels 110 or 114.

When photoelectric cell 26 has indicated that a predetermined length of acceptable rod has passed by shear 14, the shear will again be actuated to divide the rod. Since rotary switch 12 had previously been rotated, the leading end of the second acceptable rod portion will enter rod receiving passageway 40 and proceed through intermediate connecting pipe 20 to crop switching pipe 56. In preparation for this step, the downstream end of crop switch pipe 56 has now been raised in order to direct the second acceptable rod portion to reel switching pipe 74. Depending on whether the downstream end of reel switching pipe 74 is in a raised or lowered position, the second oncoming acceptable rod portion will be directed to either laying reels 112 or 116.

As the second acceptable rod portion continues to pass through rotary switch 12, the switch body 36 is again rotated through 180° in order to return rod receiving passage 40 to its lowered position as shown in FIG. 2. The dividing shear 14 is then again actuated to crop the off-gauge tail end of the second acceptable rod portion. This of course results in the cropped end being raised by the combined action of shear knives 28 and 30 to again be directed into upper rod receiving passage 38. The cropped tail end will then proceed through intermediate connecting pipe 18 and thereafter enter crop switching pipe 58. In preparation for this operation, the downstream end of crop switching pipe 58 has been depressed by piston 64 to its lowered position 58a in communication with the upstream extension 120 of crop receiving pipe 118. In this manner, the cropped tail end of the second acceptable rod portion is directed through the downstream continuation 128 of crop receiving pipe 118 to a crop bin.

It can therefore be seen that the switching apparatus can be adjusted to accommodate any operating sequence of the shear 14.

For example, the next rod might require subdivision into three or four portions. Another rod might not require leading or tail end cropping. In any event, successive oncoming acceptable rod portions can be directed to one of four laying reels by properly adjusting the switching apparatus. In this manner, after one reel is filled, rod can be directed to one of the remaining three reels while the filled reel is cleared. With this sequence of operation, adequate clearing time for each reel is positively assured.

Referring now to FIGS. 7–13, an alternate embodiment of the invention will now be described. Depending upon the speed of the rod travelling through the mill, difficulty may be encountered in passing cropped ends through the continuous series of passages provided by rotary switch 12, intermediate pipes 18 and 20, crop switching pipes 56 and 58, crop receiving pipe 18 and downstream continuation 128. More particularly, in mills operating at slower speeds, the momentum of the cropped end following the cropping operation may not be sufficient to overcome the frictional resistance of this extended travel. Where this situation exists, cropped ends might conceivably become lodged in one of the above-mentioned passages.

To avoid this difficulty, the alternate embodiment of the invention provides a means of considerably shortening the overall length of the crop receiving apparatus. As can be seen by comparing FIGS. 1–6 with FIGS. 7–13, this is accomplished both through the elimination of intermediate connecting pipes 18 and 20 between the rotary switch 12 and the crop switch 16 and in addition, by the re-location and re-design of the crop receiving apparatus.

Figure 13:
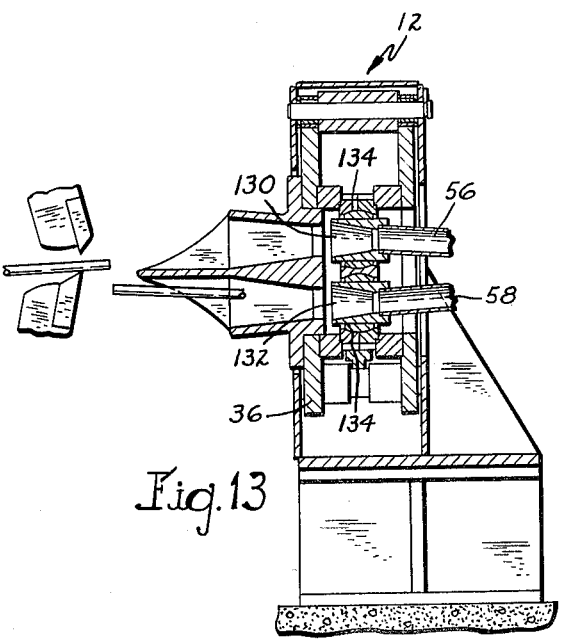
FIG. 13 is a sectional view of the rotary switch taken along line 13—13 of FIG. 8.

As can best be seen in FIG. 13, the upstream ends of crop switching pipes 56 and 58 have, in the alternate embodiment of the invention, been pivotally connected to the rotating switch body 36 of rotary rod switch 12. This of course has necessitated minor modifications in the construction of the switch body. More particularly, funnel-shaped passages 130 and 132 pivotally mounted within servical type bearings 134 have been substituted for the parallel passages 38a and 40a shown in FIG. 2. With this construction, the upstream ends of crop switching pipes 56 and 58 are connected directly to passages 130 and 132 to provide pivotal rotatable units. This in turn allows the upstream ends of crop switching pipes 56 and 58 to be vertically displaced by hydraulic cylinders 62 and 64 much in the same manner as in the principal embodiment of the invention. It will of course be apparent that by the use of this construction, the distance between rotary rod switch 12 and crop switch 16 is considerably reduced.

Figure 8:
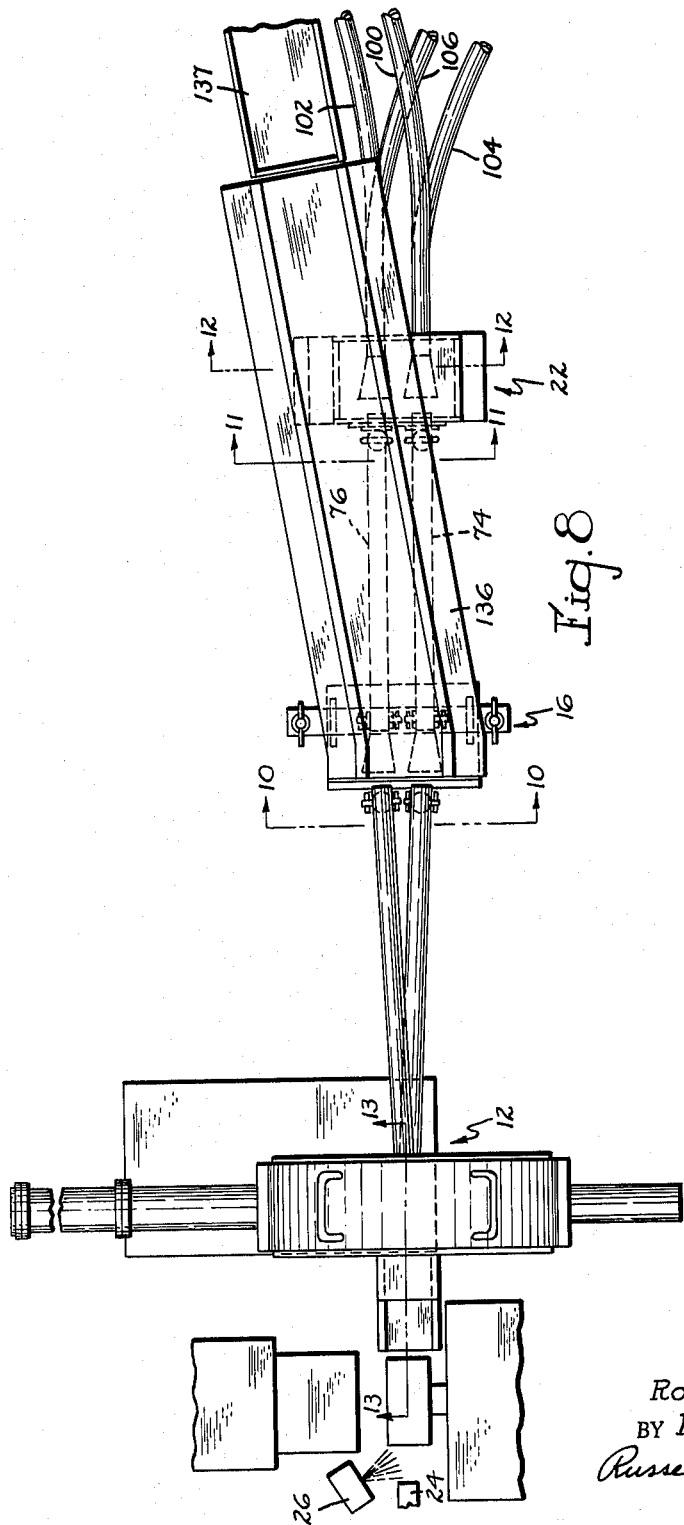
FIG. 8 is an enlarged plan view of the switching apparatus illustrated in FIG. 7.
Figure 9:
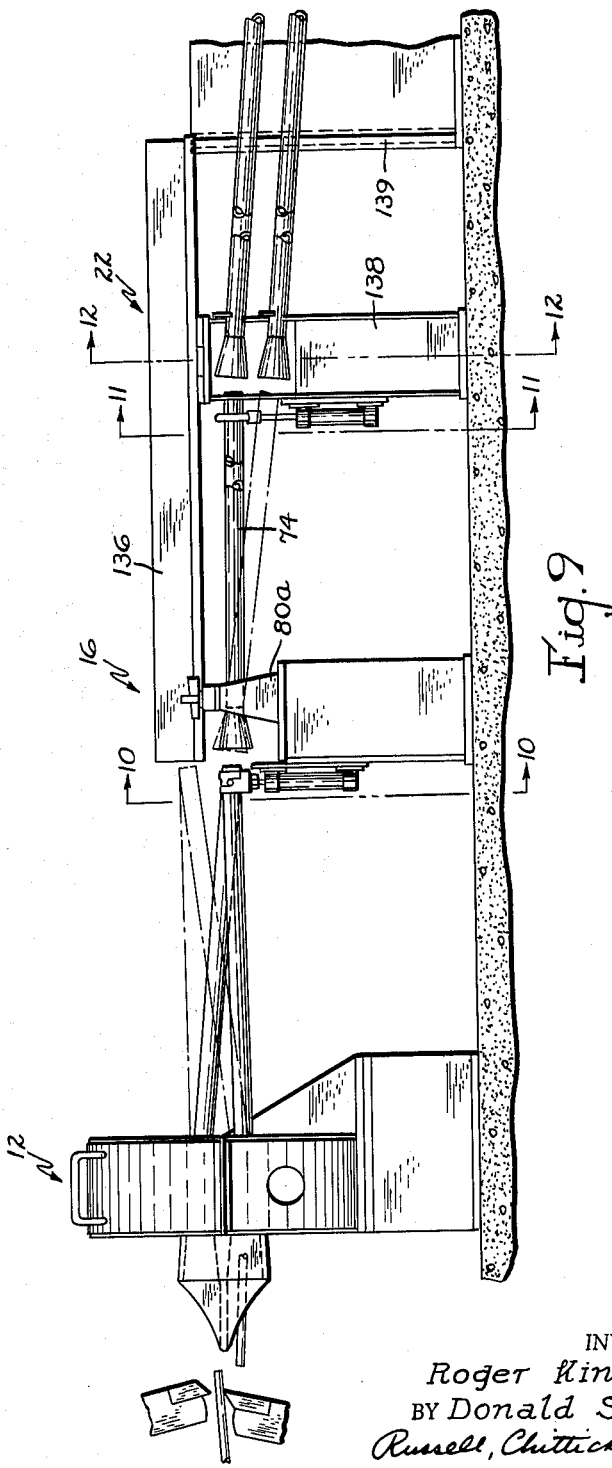
FIG. 9 is a side elevational view of the switching apparatus shown in FIG. 7.
Figure 10:
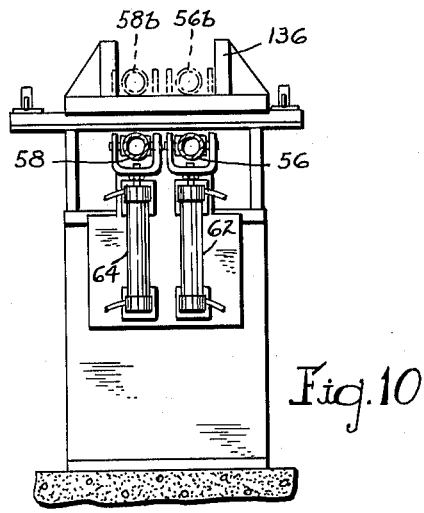
FIG. 10 is a sectional view taken along line 10—10 of FIG. 8.

The structural modification relating to the crop receiving apparatus will now be discussed. As can be seen in FIGS. 9 and 10, the downstream ends of crop switching pipes 56 and 58 are adjustable from a lowered position to a raised position indicated at 56b and 58b in communication with a longitudinal crop chute 136. As can be seen in FIGS. 8 and 9, crop chute 136 extends above crop switch 16 and reel switch 22 and is somewhat angularly disposed from the general direction of the passline. The crop chute extends to a crop bin 137 and is supported at its upstream end by a modified mounting bracket 80a and at its downstream end by pipe stands 138 and 139. With this construction, either hydraulic cylinder 62 or 64 may be actuated to raise the downstream ends of either crop switching pipes 56 or 58 to a raised position 56b and 58b in direct communication with crop chute 136. When in a lowered position, the crop switching pipes are in communication with the upstream ends of reel switching pipes 74 and 76.

Figure 11:
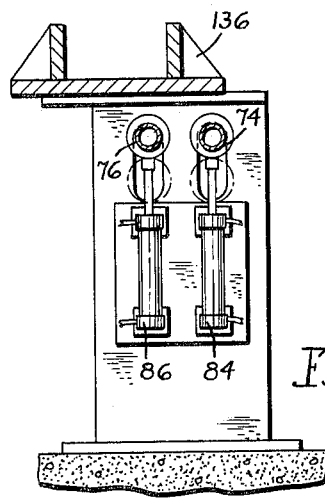
FIG. 11 is a sectional view taken along line 11—11 of FIG. 8.
Figure 12:
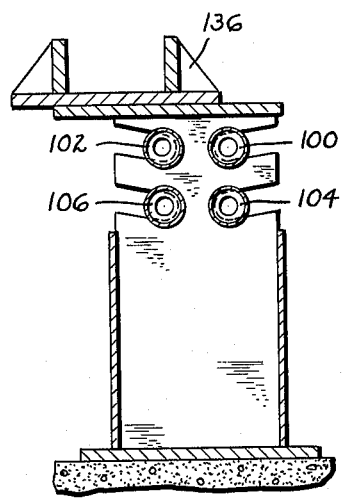
FIG. 12 is a sectional view taken along line 12—12 of FIG. 8.

As can be seen in FIGS. 11 and 12, the downstream ends of reel switching pipes 74 and 76 are again vertically adjustable by means of hydraulic cylinders 84 and 86 from a raised position in communication with either reel pipes 100 or 102 to a lowered position in communication with reel pipes 104 and 106. It is also apparent from these figures that crop chute 136 gradually extends away from the general direction of the pass line.

As previously mentioned, the advantages of this alternate construction are concentrated principally in the area of facilitating the travel of cropped ends to a terminal crop receiving apparatus. It can readily be seen that by providing a more direct and greatly shortened travel from the dividing shear 14 to the crop chute 136, frictional resistance is greatly diminished and the chances of a cropped end becoming lodged in a confined passageway completely obviated.

The method of operating the alternate embodiment of the invention is of course essentially identical to that used in operating the principal embodiment. The rotary rod switch 12, crop switch 16 and reel switch 22 are again adjustable in the same manner to accommodate all combinations of shear operation.

It is our intention to cover all changes and modifications of the invention herein chosen for purposes of disclosure which do not constitute departures from the spirit and scope of the invention.

We claim:

1. A switching means for directing moving rod to a plurality of laying reels in a rolling mill in which the time of clearing a single laying reel compared with the coiling time requires the use of three or more laying reels, said switching means comprising the combination of: a rotary rod switch positioned downstream from a dividing shear, said rod switch having upper and lower rod receiving passages extending therethrough, said lower rod receiving passage aligned to receive the leading edge of unsheared rod, said shear when actuated directing the sheared leading end of the next oncoming rod portion into said upper rod receiving passage while the preceding rod portion continues to pass through said lower rod receiving passage, means for rotating said rod switch in order to reverse the positions of said upper and lower rod receiving passages; a crop switch positioned at some distance downstream from said rotary rod switch and having crop switching passages extending therethrough, connecting means intermediate said rotatable rod switch and crop switch for placing the downstream ends of said rod receiving passages in communication with the upstream ends of said crop switching passages, means for independently adjusting the downstream ends of said crop switching passages from a raised position to a lowered position in communication with a crop receiving device; a reel switch positioned downstream from said crop switch and having reel switching passages extending therethrough, the upstream ends of said reel switching passages in communication with the raised downstream ends of said crop switching passages, means for independently adjusting the downstream ends of said reel switching passages in order to direct rod passing therethrough to one of a plurality of laying reels.

2. The apparatus as set forth in claim 1 wherein said crop switch is comprised of two tubular crop switching pipes forming longitudinal crop switching passages, the upstream ends of said crop switching pipes in communication through said connecting means with the rod receiving passages in said rotary rod switch, means for pivotably displacing said crop switching pipes about their upstream ends in order to vertically adjust their downstream ends from a raised position to a lowered position in communication with a crop receiving device.

3. The apparatus as set forth in claim 2 wherein said connecting means is comprised of two intermediate tubular pipes, the upstream ends of each of said pipes in communication with the rod receiving passages in said rotary rod switch, said intermediate pipes pivotally mounted to said rotary rod switch for rotation therewith, the downstream ends of said intermediate pipes in communication with the upstream ends of said crop switching pipes.

4. The apparatus as set forth in claim 2 wherein said means for pivotably displacing said crop switching pipes about their upstream ends is comprised of hydraulic cylinders having vertically extensible piston arms slidably mounted therein, each said cylinders positioned beneath the downstream end of one of said crop switching pipes and having the upper end of its vertically extensible piston arm attached thereto, each said cylinder being independently operable in order to selectively raise or lower the downstream ends of said crop switching pipes.

5. The apparatus as set forth in claim 1 wherein said reel switch is comprised of two tubular reel switching pipes forming longitudinal reel switching passages, each said reel switching pipes in communication at their upstream ends with the raised downstream ends of said crop switching pipes, means for pivotably adjusting the downstream ends of each said reel switching pipes about their upstream ends in order to direct rod passing therethrough to one of a plurality of laying reels.

6. For use in a rolling mill, a switching means for directing moving rod to a plurality of laying reels where the time for clearing a single reel compared with the coiling time requires the use of three or more laying reels, said switching means comprising the combination of: a rotary rod switch positioned downstream from a shear, said rod switch having upper and lower rod receiving passages extending therethrough, said lower rod receiving passage aligned to receive the leading edge of unsheared rod, said shear when actuated directing the sheared leading end of the next oncoming rod portion into said upper receiving passage while the preceding rod portion continues to pass through said lower rod receiving passage, means for rotating said rod switch in order to reverse the positions of said upper and lower rod receiving passages; a crop switch positioned at some distance downstream from said rotary rod switch, said crop switch comprising two tubular crop switching pipes forming longitudinal crop switching passages, the upstream ends of said crop switching pipes in communication through intermediate connecting means with the rod receiving passages in said rotary rod switch, means for pivotally displacing said crop switching pipes about their upstream ends in order to vertically adjust their downstream ends from a raised position to a lowered position in communication with a common crop receiving device; connecting means intermediate said rotatable rod switch and said crop switch for placing the downstream ends of said rod receiving passages in communication with the upstream ends of said crop switching passages, said connecting means comprising two intermediate tubular pipes, the upstream ends of each said pipes in communication with the rod receiving passages in said rotary rod switch, said intermediate pipes pivotally mounted to said rotary rod switch for rotation therewith, the downstream ends of said intermediate pipes in communication with the upstream ends of said crop switching pipes; means for independently adjusting the downstream ends of said crop switching passages from a raised position to a lowered position in communication with a crop receiving device; a reel switch positioned downstream from said crop switch, said reel switch comprising two tubular reel switching pipes forming longitudinal switching passages, each said reel switching pipes in communication at their upstream ends with the raised downstream ends of said crop switching pipes, means for pivotally adjusting the downstream ends of each said reel switching pipes about their upstream ends in order to direct rod passing therethrough to one of a plurality of laying reels.

7. A switching means for directing moving rod to a plurality of laying reels in a rolling mill in which the time of clearing a single laying reel compared with the coiling time requires the use of three or more laying reels, said switching means comprising the combination of: a rotary rod switch positioned downstream from a shear, said rod switch having upper and lower rod receiving passages extending therethrough, said lower rod receiving passage aligned to receive the oncoming leading edge of unshear rod, said shear when actuated directing the sheared leading end of the next oncoming rod portion into said upper rod receiving passage while the preceding rod portion continues to pass through said lower rod receiving passage, means for rotating said rod switch in order to reverse the positions of said upper and lower rod receiving passages; a crop switch positioned downstream from said rotary rod switch and connected thereto, said crop switch comprised of two tubular crop switching pipes forming longitudinal crop switching passages, the upstream ends of said crop switching pipes pivotally connected to said rotary switch for rotation therewith, said crop switching pipes in communication with the rod receiving passages in said rotary rod switch, means for pivotally displacing said crop switching pipes about their upstream ends in order to vertically adjust their downstream ends from a raised position in communication with a crop receiving device to a lowered position; a reel switch positioned downstream from said crop switch, said reel switch comprising two tubular reel switching pipes forming longitudinal reel switching passages, each said reel switching pipes in communication at their upstream ends with the raised downstream ends of one of said crop switching pipes, means for pivotally adjusting the downstream ends of each said reel switching pipes about their upstream ends in order to direct rod passing therethrough to one of a plurality of laying reels.

References Cited by the Examiner

UNITED STATES PATENTS

| | | | |
|---|---|---|---|
| 2,607,460 | 8/1952 | Russell | 193—39 |
| 2,666,534 | 1/1954 | Pietsch | 72—29 |
| 2,701,016 | 2/1955 | Bedson | 83—105 |
| 2,711,809 | 6/1955 | O'Keefe et al. | 72—419 |
| 2,881,835 | 4/1959 | Morgan | 83—162 |

CHARLES W. LANHAM, *Primary Examiner.*

H. D. HOINKES, *Assistant Examiner.*